United States Patent [19]

Still et al.

[11] 4,333,441
[45] Jun. 8, 1982

[54] DEVICE FOR IMPROVING THE FUEL-GAS AIR MIXTURE AND THE OPERATION OF AN INTERNAL COMBUSTION ENGINE

[76] Inventors: Thomas W. Still, 3013 Sanignacio; William H. Sherlock, 3357 Granada Ave., both of El Monte, Calif. 91731

[21] Appl. No.: 132,613

[22] Filed: Mar. 21, 1980

[51] Int. Cl.³ .............................................. F02M 29/00
[52] U.S. Cl. .................. 123/590; 261/79 R; 48/180 R
[58] Field of Search ............... 123/590, 591, 592; 261/78 R, 79 R; 48/180 R, 180 M, 180 S

[56] References Cited

U.S. PATENT DOCUMENTS

| | | | |
|---|---|---|---|
| 2,119,927 | 6/1938 | Reid | 123/590 |
| 3,437,467 | 4/1969 | Jacobus | 123/590 |
| 3,544,290 | 12/1970 | Larson et al. | 123/592 |
| 4,015,574 | 4/1977 | Hanff | 123/590 |
| 4,092,966 | 6/1978 | Prosen | 123/590 |
| 4,274,386 | 6/1981 | Reyes | 123/590 |

Primary Examiner—Ira S. Lazarus
Attorney, Agent, or Firm—Edward J. DaRin

[57] ABSTRACT

A flanged plate for insertion between the carburetor and manifold bores for an internal combustion engine to intercept the fuel-air mixture immediately after it leaves the carburetor around the throttle valve therefor. The plate comprises a plurality of flanged areas constructed and defined to intercept the fuel and air mixture while minimizing the restriction of the flow. The flanged areas are defined over 180 degrees of the carburetor bore to generate a multiplicity of small vortices that interfere with and reduce the large vortex that is generally produced immediately below the carburetor's throttle valve. The interaction of the vortices causes a reduction in back pressure, improved mixing of the fuel and air and increased volume of flow of the fuel and air mixture into the engine leading to more complete combustion and increased miles per gallon of fuel with a cleaner exhaust stream.

21 Claims, 8 Drawing Figures

TO INTERNAL COMBUSTION ENGINE ~13~

U.S. Patent Jun. 8, 1982 Sheet 3 of 3 4,333,441
Fig. 5.
Fig. 6.
Fig. 7.
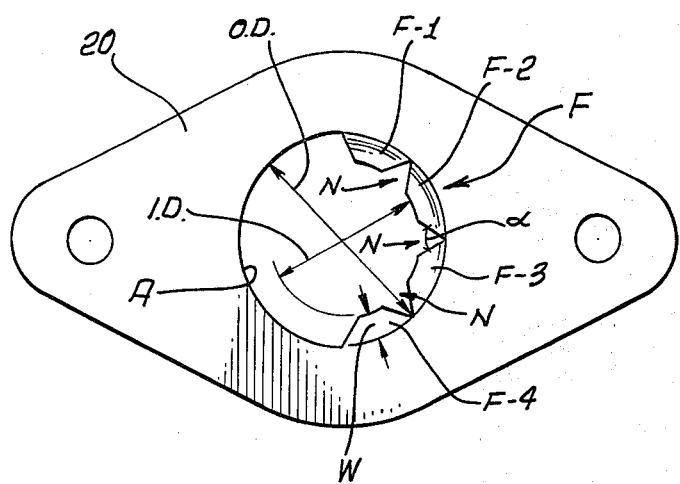
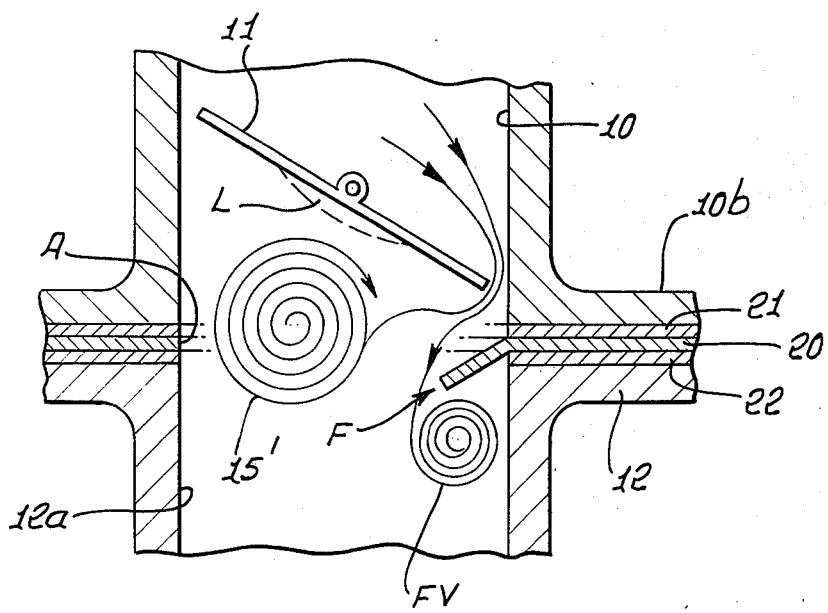
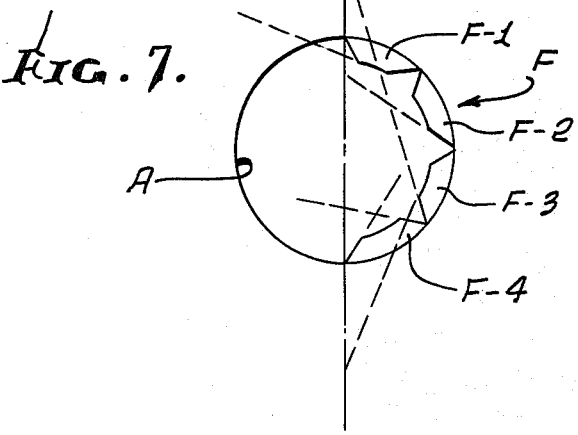

DEVICE FOR IMPROVING THE FUEL-GAS AIR MIXTURE AND THE OPERATION OF AN INTERNAL COMBUSTION ENGINE

This invention relates to a device for improving the fuel-air mixture and operation of an internal combustion engine and more particularly to a flanged plate mountable within the carburetor-manifold system of an internal combustion engine.

BACKGROUND OF INVENTION

The internal combustion engine is commonly employed on present day motor vehicles and many other types of devices. The internal combustion engine commonly employs a carburetor and manifold system for mixing and distributing fuel and air to the internal combustion engine for powering the vehicle or the like. It is recognized that standard carburetors provide only a limited mixing of the fuel and air for an internal combustion engine. The optimum fuel mixture required for most gasoline powered engines is 13% gasoline and 87% air. Any deviation from this ratio can result in degradation of engine performance. As a result of improper mixing of the fuel and the air, the operation of an internal combustion engine results in incomplete combustion of the fuel-air mixture and the production of an exhaust having unburned gases and raw fuel. The incomplete combustion also is responsible for the exhaust of the internal combustion engine containing "smog" producing components as well as being inefficient in the operation of the engine.

The prior art has recognized the limited mixing action of the fuel and air by means of a carburetor and has proposed various devices to improve the mixing of the fuel and air. Many of the prior art devices designed to improve fuel efficiency are complex mechanisms that are expensive to manufacture, install and maintain and are only operative within limited speed ranges of the motor vehicle. In general, these prior art devices fail to meet the practical requirements of vehicle operation, namely fuel efficiency at all highway speeds under acceleration, deceleration and idling conditions. Typical of such prior art devices are those disclosed in U.S. Pat. Nos. 1,689,446, 3,815,565, 3,966,430, 4,015,574, 4,094,290, and 4,092,966. The prior art devices disclosed in the aforementioned patents are constructed to improve the mixing action of the fuel and the air by the development of numerous random vortices and turbulences. Each of the devices disclosed in the above identified patents results in undesirable back pressures being generated through their use and, therefore, degrade the operation of the internal combusion engine. The devices represented by the prior art mentioned hereinabove may produce a change in the fuel air ratio due to the undesirable back pressure generated due to their use. In general, the designs represented by the prior art may improve the mixing of the fuel and the air delivered to the engine but impede the flow of the fuel-air mixture into the internal combustion engine and often are detrimental to the operation of an internal combustion engine utilizing such a prior art device.

The prior art devices that we are aware of, whether they operate with moving parts or static devices, are generally physically centered in the bore area of the carburetor and manifold system. As a result these prior art devices obstruct 25% to 75% of the bore area of the carburetor-manifold system. Obstructions of this type in the carburetor-manifold bore system can also change the optimum fuel and air ratio thereby producing a lean mixture which may damage the internal combustion engine through overheating. To maintain normal operating temperatures there must be modifications to the cooling system and/or the timing of the engine ignition must be changed. In general the prior art devices, whether they are structured as a static or dynamic device, operate at a steady or a fixed speed. In practice a relatively steady driving speed cannot be attained by the average motorist by driving in the city, going to and from his place of employment, shop and other routine driving. It should also be appreciated that devices having moving parts further impede the flow of the fuel-air mixture because the uncontrolled moving parts cannot adjust to the repeated changes of accelerator position during acceleration and deceleration in normal driving. In addition, if there is a structural failure of the moving parts such devices may damage the engine when the parts are drawn through the manifold system into the cylinders of the engine.

BRIEF SUMMARY OF INVENTION

The present invention provides an improved, mechanically simple, inexpensive device for use with a carburetor-manifold system of an internal combustion engine resulting in improving the mixing action of the fuel and the air from the carburetor at normal driving speeds, i.e., from zero (idling) to 55 M.P.H., with a minimum obstruction of the bore area and thereby reducing the back pressure that is normally generated. Improved operation of the internal combustion engine is achieved when utilizing the present invention since an increase in the manifold vacuum is experienced resulting in an increased flow of the fuel-air mixture into the cylinders of the internal combustion engine, with an increase in volume and the improved mix between the fuel and the air, improved combustion results in the engine exhibited by an increase of miles per gallon of fuel with a reduction in the undesirable components in the exhaust stream of unburned fuel and those components that lead to the production of "smog."

The device of the present invention can be readily installed into the carburetor and manifold system of present day internal combustion engines by a skilled mechanic without requiring any further modification to the engine's cooling system or the like. The only adjustment required after the device is properly installed in the carburetor-manifold system is to reduce the engine revolutions per minute or RPM for optimum engine idle speed.

From a structural standpoint, the present invention comprehends a device for use with a throttle valve of a conventional carburetor utilized in combination with the carburetor-manifold bores conveying a fuel-air mixture into an internal combustion engine. The device comprises means adapted to be secured between the carburetor and manifold bores adjacent the carburetor throttle valve and having an aperture with a diameter substantially the same as the diameters of the carburetor-manifold bores. The aperture provided for the means includes a flanged surface extending into the aperture only on the side of the aperture receiving the descending portion of the throttle valve without interfering with the operation of the throttle valve. The flanged surface itself comprises a plurality of spaced apart flanged surfaces, each having the same configuration for intercepting a small portion of the fuel-air mixture conveyed into the manifold by means of the carburetor throttle valve while permitting the mixture to flow between each flanged surface to thereby create a turbulence in the mixture immediately below each face of each flanged surface as said mixture moves over each of the flanged surfaces.

From a method standpoint the concept of the present invention is comprehended by a method of improving the mixing of the fuel and air for use in an internal combustion engine having a carburetor. The carburetor has a throttle valve arranged immediately adjacent the outlet bore of the carburetor for controlling the volume of the fuel-air mixture flowing out of the carburetor past the throttle valve and into the internal combustion engine by means of a manifold connected therebetween during the opening of the throttle valve from a closed position to open position over normal driving speed of a vehicle or the like equipped with the internal combustion engine, and creating a normally large rotating vortex immediately below the fuel exit side of the throttle valve. The method includes the steps of intercepting the flow of the fuel-air mixture by means of a surface immediately after the mixture flows between the adjacent surface of the carburetor outlet bore and the lower edge of the throttle valve for the carburetor. Shaping the intercepting surface to cause the intercepted fuel-air mixture to create a plurality of relatively small vortices rotating in a plane parallel to and interfering with said large vortex to thereby reduce the overall back pressure created at the throttle valve whereby an increased volume and more thoroughly mixed fuel-air mixture flows into the internal combustion engine leading to more complete combustion of the fuel.

These and other features of the present invention may be more fully appreciated when considered in the light of the following specifications and drawings, in which:

FIG. 5 is an enlarged, top plan view of the detached flanged plate for a conventional one barrel carburetor.

FIG. 6 is a partial, cross sectional view of the carburetor-manifold bore system illustrating the flanged plate arranged therebetween along with a diagrammatic representation of the vortices that are generated by the throttle valve and the flanged plate;

FIG. 7 is a diagrammatic representation of the flanged sections of the flanged plate and the various vortex axes that are generated at each flanged surface of the plate.

Figure 1:
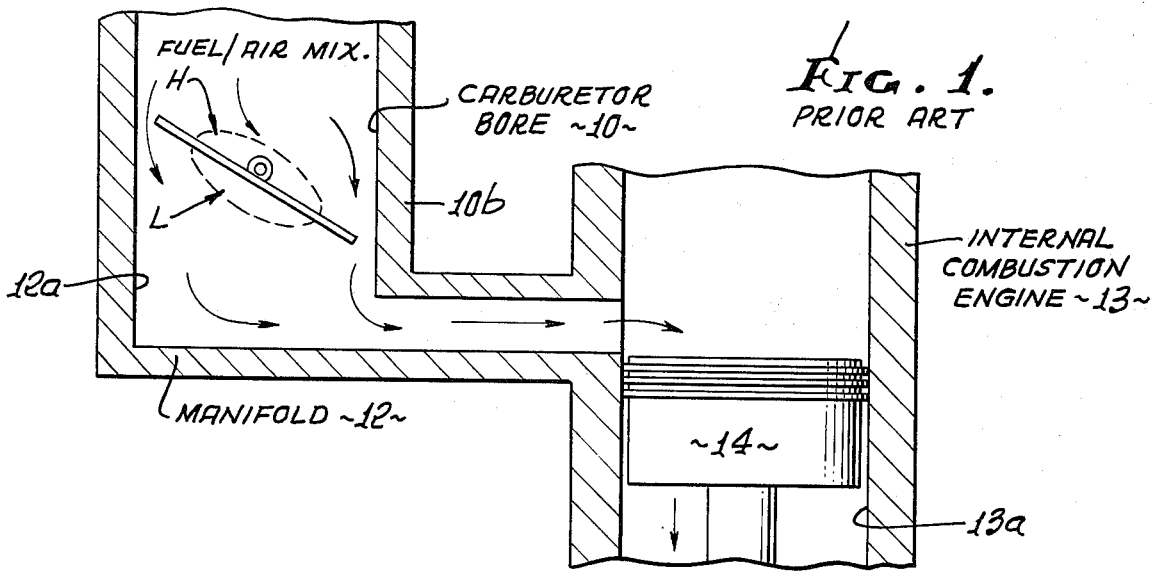
FIG. 1 is diagrammatic representation of a carburetor-manifold system utilized with an internal combustion engine in accordance with the prior art.

Now referring to the drawings, the details of the present invention will be disclosed. Prior to entering into the detailed description of the invention per se, the arrangement of the carburetor-manifold system as employed with a conventional internal combustion engine will be examined so that the relationship of the invention to this system can be better appreciated. The carburetor-manifold-internal combustion engine arrangement in accordance with the prior art is illustrated in FIG. 1 in a diagrammatic fashion. The outlet bore of a carburetor is illustrated in FIG. 1 and it is identified by the reference numeral 10. The outlet bore 10 of the carburetor mounts a conventional throttle valve 11 which is rotatable between a fully closed, horizontal position, through various open positions to a fully open position when it is in a vertical orientation as illustrated in FIG. 1. When the throttle valve 11 is in a horizontal position it is in a closed position and the fuel and air mixture provided by the carburetor does not flow out of the carburetor bore 10. The manifold 12 has a bore 12a of the same diameter as the carburetor bore 10 and receives the fuel-air mixture from the carburetor bore and delivers it to the cylinder 13a of the internal combustion engine 13. The fuel and air mixture, then, provided by the carburetor exits the carburetor by means of the bore 10 and flows into the manifold 12 and from there it is charged into the cylinder 13a for the internal combustion engine 13 during the charging stroke thereof, i.e., when the piston 14 for the engine 13 is descending as illustrated in FIG. 1. It should be recognized that a complete carburetor (not shown) operates in a conventional fashion to mix the fuel and air or the gasoline and air to be ignited and burned in the internal combustion engine 13 for generating the power to drive the motor vehicle or device associated with the engine. When the throttle valve 11 is arranged in an angular position between a fully closed and a fully open position, as illustrated in FIG. 1, the majority of the fuel-air mixture tends to follow the path of least resistance and flows into the manifold 12 along the descending surface of the throttle valve rather than through the opposite open side. It should be understood, however, that the fuel-air mixture does flow around opposite edges of the throttle valve 11 although the portion between the descending lip of the throttle valve and the adjacent wall of the carburetor bore 10 is most effective.

Figure 2:
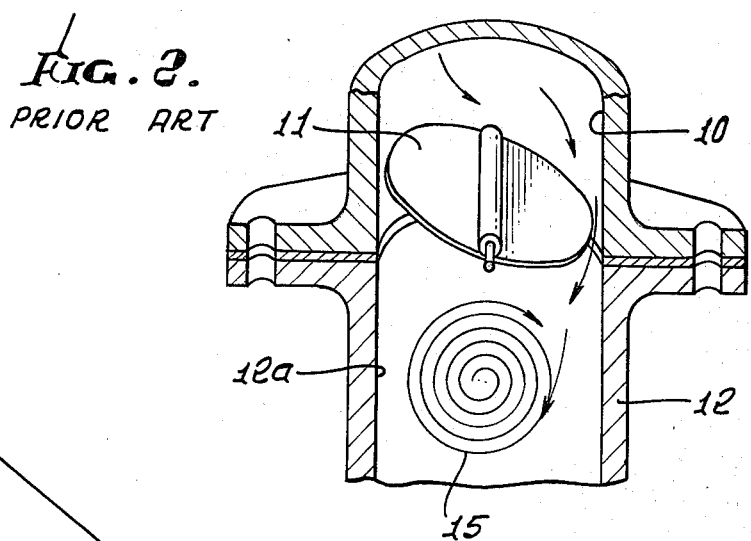
FIG. 2 is a partial, cross sectional view of the carburetor-manifold bores having the throttle valve arranged at the fuel-air exit end of the carburetor and diagrammatically illustrating the location of a vortex generated immediately below the throttle valve in accordance with the prior art.

It is recognized in the prior art that conventional carburetors do not provide proper mixing of the fuel or gasoline and the air for most efficient operation. It is also recognized in the prior art that the throttle valve 11 creates a large restriction in the path of the flow of the fuel-air mixture from the carburetor to the manifold and then into the internal combustion engine 13. The prior art also recognizes that a low pressure area L, illustrated in dotted outline, is generated immediately below the manifold side of the throttle valve 11 so as to create a normally large rotating vortex 15 immediately below the fuel exit side of the throttle valve as illustrated in FIG. 2. The air-fuel mixture as it descends along the descending surface of the throttle valve 11 and out of the carburetor bore 10 produces the rotating vortex 15 that increases in outer diameter as it rotates inwardly as in FIG. 2. The prior art recognizes that such a rotating vortex creates a back pressure in the system and reduces the manifold vacuum so that the volume of flow of the fuel and air mixture into the cylinder 13a for the internal combustion engine 13 is reduced. These basically are the problems with the prior art carburetor-manifold system for delivering the fuel-air mixture to the cylinder 13a of an internal combustion engine to be ignited during the upward stroke of the piston 14 for powering the motor vehicle or unit associated with the internal combustion engine.

With the above prior art structure in mind, the present invention will be described as it is integrated into such a prior art structure. The improvement in accordance with the teaching of the present invention relates to the simple use of a flange plate 20 mounted between the outlet of the carburetor 10b or the bore 10 and the manifold 12. The flanged plate 20 is constructed and defined to intercept the flow of the fuel-air mixture by means of the flanged surface F immediately after the mixture flows between the adjacent surface of the outlet bore 10 for the carburetor 10b and the lower edge of the throttle valve 11 for the carburetor. The plate 20 is shaped so that its intercepting surface F causes the portion of the fuel-air mixture that is intercepted to create a plurality of relatively small vortices rotating in a plane parallel to and interfering with the vortex 15 to thereby reduce the overall back pressure created at the throttle valve 11 whereby an increased volume and more thoroughly mixed fuel-air mixture flows into the internal combustion engine 13. It should be recognized at the outset that although the plate 20 is defined as a separate element that it can be integrated into the construction of the normal carburetor at the fuel exit end of the carburetor bore 10 immediately below the throttle valve 11 or integrated in with the bore 12a for the manifold 12 to produce the same function and effect as the individual plate 20. The use of a separate plate 20 allows it to be readily integrated into present day motor vehicles as well as new vehicles without requiring changing the structure of either the carburetor or the manifold systems presently in use.

Figure 3:
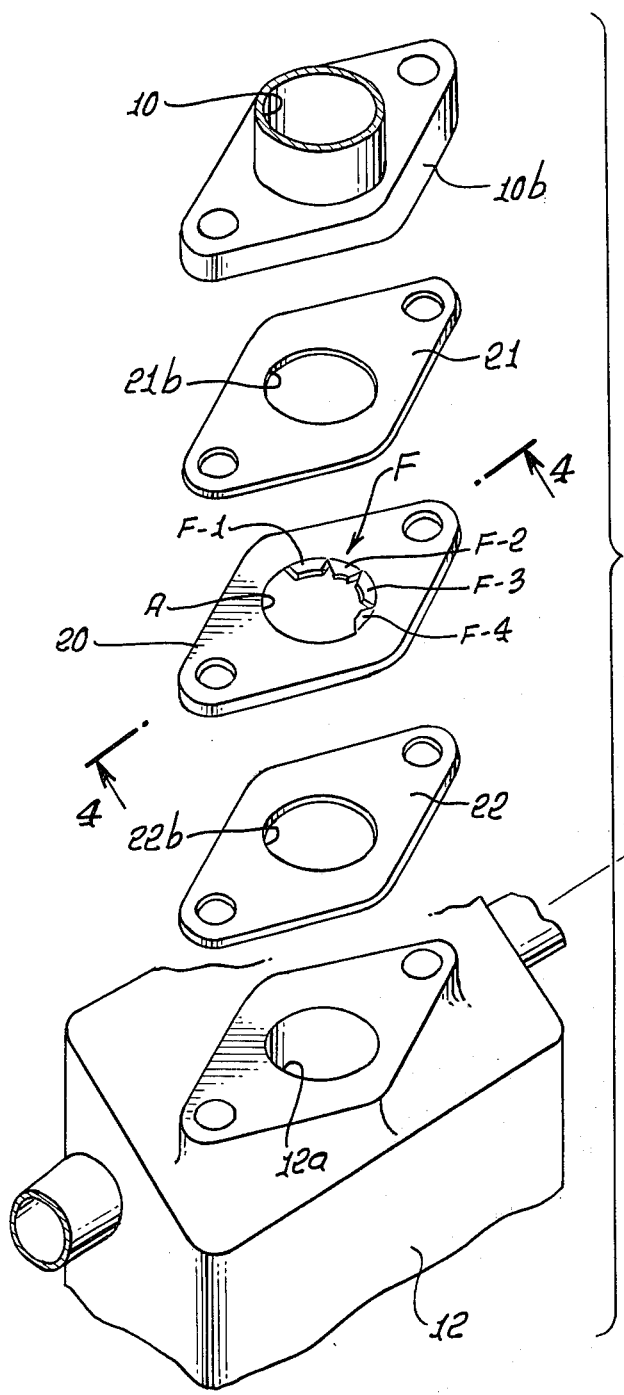
FIG. 3 is an exploded view of the carburetor-manifold bore system illustrating the arrangement of the assembly of the flanged plate of the present invention therewith.

The assembled arrangement of the carburetor 10b, manifold 12 and plate 20 is illustrated in an exploded fashion in FIG. 3 and in its assembled relationship in FIG. 6. The flanged plate 20 is secured between the carburetor 10b and the manifold 12 by means of a gasket 21 having a bore 21b of the same diameter as the carburetor bore 10 and arranged between the top face of the plate 20 and the bottom face of the carburetor 10b. On the opposite side of the plate 20 there is a second gasket 22 having a bore 22b of the same diameter as the bore 12a for the manifold and the bore 10 for the carburetor. The gasket 22 is arranged to overlie the manifold bore 12a and separate the plate 20 so as to tightly secure the plate 20 in sealed relationship with the carburetor 10b and the manifold 12. This relationship is secured by means of fasteners (not shown) secured to the ends of the carburetor 10b, gaskets 21 and 22, plate 20 and manifold 12 as is evident from examining FIG. 3. In this arrangement, in accordance with the teachings of the present invention, it is necessary that the plate 20 be placed as close as possible to the throttle valve 11 so that it is effective at all speeds. It will be recognized that the diameter of the bore A for the plate 20 is the same diameter as the carburetor bore 10 and the manifold bore 12a. The flanged portion F of the plate 20 is generally identified by the reference letter F. The flanged portion F for the plate 20 extends inwardly of the bore A for the plate 20 and is constructed and defined to intercept a portion of the fuel-air mixture as it emerges between the descending side of the throttle valve 11 and the wall of the bore 10 over approximately 180 degrees of the diameter of the bore A. The flanged portion F is mounted adjacent the descending side of the throttle 11 without creating restrictions setting up detrimental back pressures in the carburetor-manifold system. Stated differently, as distinguished from the prior art, not only is the flanged portion F defined only over a portion of the bore diameter but it is arranged only on that side of the bore 10 of the carburetor to intercept the fuel-air mixture flowing between the descending lip of the throttle valve 11 and the bore 10 of the carburetor, as illustrated in FIG. 6.

The important aspect of the plate 10 is the construction and definition of flanged surface F. In general, the shape of the flanged surface F is proportioned relative to the size or diameter of the carburetor bore 10 and manifold 12a for proper engine operation. Specifically the thickness and width of the shape's surface F varies relative to the fuel system's bore diameters and the maximum volume of air and fuel repaired to pass through the system as controlled by the operation of the engine. The shaped area F, as illustrated in FIG. 5 in enlarged form, comprises a plurality of spaced apart areas shown as four areas identified by the reference characters F-1, F-2, F-3, and F-4, extending over 180 degrees of the circumference of the bore A for the plate 20. Each surface F-1, F-2, etc. is spaced apart by an opening that extends to the inner circumference of the bore A and as illustrated in the drawing consists of a V-shaped notch N with the individual arms of the V being unique to one side of the flanged surfaces F-1 and F-2, etc. The innermost surface of each flanged surface F-1, F-2, etc. is defined by a diameter which is concentric or coaxial with the bore A and having a length defined in proportion relative to the size of the bore A as described hereinabove.

At this point it should be recalled that in the prior operation of the throttle valve 11, FIG. 1, the large surface area exposed by the throttle valve 11 produces a high pressure increment H on the top side of the valve 11 and a low pressure increment L on the bottom side of the valve. Both of these pressure increments are developed by the descending mass of the fuel-air mixture in the carburetor 10b so that the mixture moves at a reduced velocity to impede the flow of fuel-air mixture into the manifold 12 and the engine 13. The large vortex 15 that is defined immediately below the throttle valve 11 rotates at 90 degrees to the axis of the flow of the fuel-air mixture and is centered in the middle of the bore 12a in a plane horizontal to the plane of plate 20. In the same fashion, the flanged surface F of the plate 20 intercepts a portion of the flow of the fuel-air mixture drawn from the carburetor bore 10 into the manifold bore 12a and for the same reasons the shaped flange portion F of the plate 20 generates smaller vortices rotating in a plane parallel to the large vortex and one such vortex is identified in FIG. 6 by the reference letter FV. At the V-shaped openings N for the flanged surfaces F paired vortices are introduced into the air-fuel mixture rotating clockwise and counterclockwise. In addition, each separate straight and curved edge of the flanged surfaces F-1, F-2, F-3, and F-4 form additional vortices. As a result of the generation of the individual vortices provided by the various surfaces of the flanged surface F the vortex 15 that is normally generated below the throttle valve 11 is divided and reduced in size in accordance with the geometric configuration of the flanged surfaces F of the plate 10, as diagrammatically illustrated in FIG. 6 wherein the reduced size of the vortex is identified by the reference numeral 15'. The reduced size of the larger throttle vortex 15' reduces the size and volume of the low pressure area immediately below the throttle valve 11. All the vortices that are generated in this arrangement of the plate 20 now rotate the fuel-air mixture to the center of the bore 10–12a pulling the fuel-air mixture away from the wall of the bore 12a and conveying it into the combustion chamber or cylinder 13a for the internal combustion engine 13.

A small surface area is defined for the flanged surface areas F-1, F-2, F-3 and F-4 and generally the surface that is exposed to the fuel-air mixture leaving the carburetor bore 10 is on the order of 15% to 25% of the total bore area for the bore A of the plate 20. The intercepting surfaces of the individual flange elements F-1, F-2, F-3 and F-4, produce negligible high and low pressure areas above and below the flanged surfaces F-1, F-2, F-3, and F-4 which keeps the back pressures and other obstructing currents to a minimum. The size, location and relative position of each flange area F-1, F-2, F-3, and F-4 and the speed of the vortices generated thereby combine to improve the mixing of the fuel and air outside of the carburetor and also to reduce the back pressure leading to an increased manifold vacuum and increased volume of flow and the fuel-air mixture into the internal combustion engine 13. This has been demonstrated by the manifold vacuum being increased in a motor vehicle that is provided with the plate 20 of the present invention. The improved mixing action of the fuel and air as a result of including the flanged plate 20 into the motor vehicle system is evidenced by the reduction in gasoline consumption and the improved combustion of burning of the fuel-air mixture in the cylinders of the engine 13.

Figure 4:
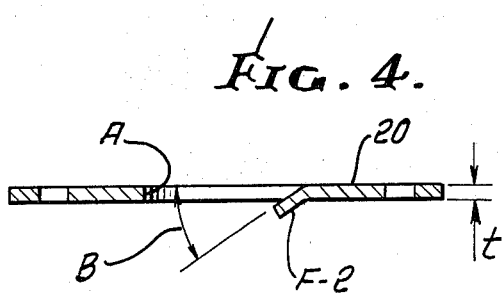
FIG. 4 is a cross sectional view of the flanged plate of the present invention taken along the lines of 4—4 of FIG. 3.

The shape flange surfaces F-1, F-2, F-3, and F-4 are arranged at an acute angular relationship with the horizontal plane of the plate 20 as is evident from examining FIGS. 4 and 6. The angle at which the flanged surfaces F-1 and F-2 descend into the manifold bore 12a is determined by the clearance required between the descending lip of the throttle valve 11 and the top surfaces of the flanged areas F-1, F-2 and F-3. For most present day constructions the angle of the plane surfaces F-1, F-2 from the horizontal plane of the plate 20 will be on the order of 32 degrees plus or minus 4 degrees. This will provide a clearance between throttle valve 11 and the surfaces F of approximately 1/16 of an inch. The acute angle selected relative to the horizontal position of the plate 20 must be sufficient to prevent back pressures and other obstructing currents to be generated in the flow path of the fuel-air mixture.

Now referring to FIG. 7 it will be noted that the configuration of the bore A and flanged surface F is illustrated therein. The vortices that are generated by the flanged surfaces F-1, F-2, F-3 and F-4 are generated at each surface of the individual flanges and one-half of the minimum number of vortex axes for the configuration of the flanged surfaces F illustrated in FIG. 7 are represented by dotted lines. These vortex axes indicate where a vortex is generated at each of the surfaces F-1, F-2, F-3, and F-4 and for those surfaces that are not illustrated in FIG. 7 additional vortex axes will be generated but have been omitted so as to not duplicate the various vortex axes illustrated. Stated differently for each dotted line illustrated associated with a surface F-1, F-2, F-3, and F-4 a similar dotted line will be produced at a corresponding surface for each other flanged surface F-1, F-2, F-3, and F-4. The series of vortices that are formed are formed in the manner illustrated diagrammatically in FIG. 6 and roll onto one another in the fashion of a carpet roll as illustrated in conjunction with the vortex FV in FIG. 6. A series of vortices are formed and as one detaches from the plate 20 another is formed. The vortices break up when they move into each other and thereby reduce the back pressure that is generated at the throttle valve 11.

Figure 8:
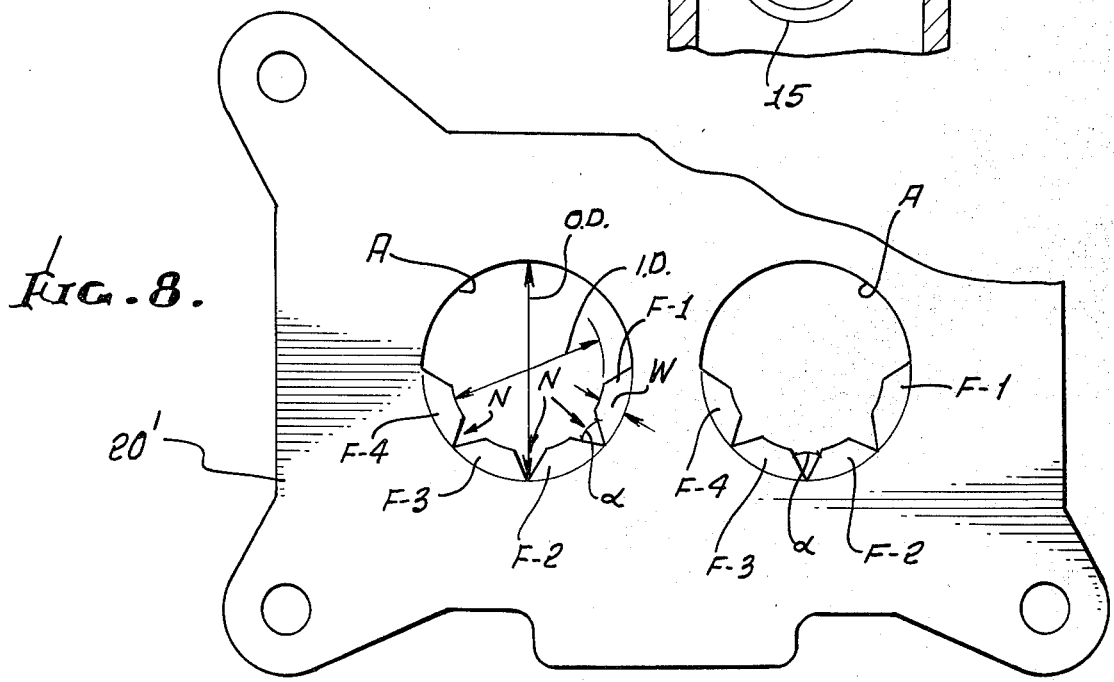
FIG. 8 is a partial, top plan view of the flanged plate configured for use with a conventional two barrel carburetor.

In a practical embodiment of the present invention as adapted for use with a two barrel carburetor of the "Auto-Lite" type certain dimensions have been found to be important for the presently preferred flanged surface F for the plate 20. In FIG. 8 the plate 20' for such a two barrel "Auto-Lite" carburetor is illustrated with the various dimensions identified to facilitate defining these parameters for proper operation in a conventional motor vehicle. The same dimensions are defined for a single bore for the plate 20 of FIG. 5. The bore A for the plate 20' is identified in FIG. 8 as O. D. It has been found to provide optimum operation when O. D. has a dimension of 1⅜ inches±1/64 of an inch. The diameter of the innermost end of the flange surfaces F-1, F-2, F-3 are identified by the dimension I. D. and it has been found to give optimum operation when it has a diameter of 15/16 of an inch with a tolerance of ±1/16 of an inch. The width of the flange or the dimension W illustrated in FIG. 8 for optimum operation should be ¼ of an inch with a tolerance of ±1/16 of an inch. The spacing N between the flange elements F-1, F-2, F-3 when they are in the form of a V for optimum operation should be defined at an angle of 60 degrees±15 degrees. This angle is illustrated in FIG. 8 as the angle α. The thickness of the plate 20 or the dimension t, as identified in FIG. 4 consistent with the above dimensions should be 3/32 of an inch±1/32 of an inch. For optimum operation it has been found that the opening between the flanged surfaces F-1, F-2, F-3, F-4 should be a V-shaped groove that extends to the circumference of the bore A as illustrated and encompasses the angle α. Three such 60 degree grooves provide optimum operation. In general, the clearance between the descending portion of the throttle valve 11 and the adjacent surfaces F-1, F-2 of the flange F should have a clearance on the order of 1/16 of an inch±1/32 of an inch. It will be appreciated when viewing the drawings that the flange surfaces F-1, F-2, F-3 only encompass 180 degrees of the bore A and this is the preferred construction for optimum operation. The acute angle to provide the necessary throttle valve clearances with the flange surfaces F is defined in FIG. 4 as the angle β. This angle β is measured with respect to the horizontal and for optimum operation should be 32 degrees±4 degrees. It should also be recognized that the angle β selected is dependent on the relative vertical spacing of the throttle valve and the flanged plate 20.

At this point it should be noted that although a preferred embodiment has been detailed herein that to improve operation in the flat surfaces F-1, F-2, F-3, and F-4 can be provided with apertures rippled and/or grooved or otherwise formed to improve the mixing of the air and fuel. The edges of the surfaces F-1, F-2, F-3, and F-4 can also be notched, slotted V'd and otherwise shaped to improve the mixing of the fuel. The surfaces F-1, F-2, F-3, and F-4 in general can be modified to shape the flat areas or the edges of the surface or any combination thereof. The shape and position of the shaped area F will be defined to permit near maximum flow of the volume of air and fuel mixture as controlled by engine operation.

The results produced by the flanged plate 20 of the present invention have been determined by operating conventional unmodified motor vehicles as they would be normally used by an average individual driving to and from his place of employment, city driving, freeway driving, etc., without any special effort being made on behalf of the driver to control the test conditions. As a result of such tests it has been found that the miles per gallon of fuel has increased as a result of utilizing the flanged plate 20 in the carburetor-manifold system of an internal combustion engine. This is attributed to the fact that the use of plate 20 provides better mixing action between the fuel and air immediately after it exits from the carburetor bore and provides increased manifold vacuum and thereby increasing the volume of fuel and air delivered to the combustion chamber or the cylinder of the internal combustion engine. All of these features combine to permit better combustion of the fuel-air mixture in the internal combustion engine leading to the improved fuel mileage. As indicated hereinabove no replacements, changes or modifications to the conventional engine are necessary as the result of including the plate 20 therein and the only adjustment necessary was to reduce the idle speed RPM since the idle speed increases.

In testing three commercially available unmodified motor vehicles the operators employed the same brand and grade of gasoline in each vehicle during the performance testing and the vehicles were driven by the same drivers before and after the plate 20 as installed on the vehicles. The vehicle accessories such as heaters, air conditioning equipment, lights, etc. were used as required in normal driving without regard to the mileage performance desired. The mileage indicating fuel consumption listed herein below is based on averages of at least 1,000 miles before and after the installation of the flanged plate 20. The smog readings that were obtained were based on a current California state tested exhaust analyzer manufactured by Sun Electric. The test results obtained were as follows:

A 1965 Plymouth Fury 3 having a Chrysler ball and ball gem carburetor installed along with a 318 cubic inch engine was tested at a time that it had a mileage of 149,670 miles on the engine before the plate 20 was installed. The mileage obtained from such a 1965 Plymouth Fury before installation of the plate 20 was 10.7 miles per gallon. After the plate 20 was installed in this Chrysler motor vehicle, the gase mileage obtained was 13.5 miles per gallon. The smog readings before installation of the plate 20 indicated hydrocarbons of 4.5 parts per million and carbon oxides at 2.5%. The same readings after the plate 20 was installed indicated a 2.5 parts per million of hydrocarbons and 1% carbon oxides.

Similar tests were conducted on a 1967 Ford Fairlane. The Ford motor vehicle employed an "Auto-Lite" carburetor and a 289 cubic inch engine. The Ford had 96,326 miles on the engine before the plate 20 was installed and obtained 15.3 miles per gallon of fuel before the plate 20 was installed. After the plate 20 was installed on the motor vehicle the engine operated at 17.87 miles per gallon. The smog readings, before the plate 20 was installed, indicated the hydrocarbons at 4.5 parts per million and 2.5% carbon oxides. After installation of the plate 20, the hydrocarbons dropped to 2.5 parts per million and only 1% of carbon oxides.

The same tests were run on a 1975 Buick Electra. The Buick Electra included a General Motor's quadrijet carburetor with a 455 cubic inch engine. The Buick had 16,822 miles on the engine before the plate 20 was installed and averaged 10.5 miles per gallon of fuel. After the plate 20 was installed the mileage increased to 14.3 miles per gallon. No smog readings were taken on the Buick motor vehicle.

It should be appreciated that the mileage indicating fuel consumption noted hereinabove is based on averages of at least 1,000 miles of test driving before and after installation of the plate 20.

It should now be appreciated by those skilled in the art that the present invention has advanced the state of the art by the provision of a flanged plate 20 that can be readily installed into conventional motor vehicles to increase the gallons per mile obtained from conventional internal combustion engines as well as reducing the smog creating components found in the exhaust. This is attributed to the improved mixing action between fuel and air as it leaves the carburetor and the increased volume of flow of the mixture into the internal combustion engine leading to the more complete combustion of the fuel and air mixture. It will be appreciated that modern carburetors are provided with one, two or four throats and that the plate 20 can be used for each carburetor so that the low speed Venturi will operate in combination with the high speed Venturis. At the minimum, each low speed Venturi should be provided with a plate 20. The plate 20 has been particularly defined so that it is operative and provides optimum operation for all speeds between zero and 55 miles per hour for normal driving, legal speeds on streets and highways at the present time.

What is claimed is:

1. A device for use with a throttle valve of a conventional carburetor-manifold system of an internal combustion engine,
    said device comprising a bore of essentially the same size as the carburetor-manifold bores to convey a fuel-air mixture therethrough to the internal combustion engine,
    said bore being constructed and defined with no more than 180 degrees of its bore diameter with means constructed and defined to extend inwardly of the periphery of the bore for intercepting a portion of said mixture from only the descending portion of the throttle valve with a minimum restriction to the flow of said mixture into the manifold and without impeding the opening movement of the carburetor throttle valve,
    said means being further characterized as creating a turbulence in the intercepted portion of said mixture immediately below said means.

2. A device for use with a throttle valve of a conventional carburetor-manifold system of an internal combustion engine, as defined in claim 1, wherein turbulence is normally created immediately below the throttle valve by the fuel-air mixture passing around the throttle valve, the turbulence created by said means interacting with said throttle valve turbulence to thereby provide improved operation of the internal combustion engine.

3. A plate having a preselected configuration for use with a carburetor-manifold system of an internal combustion engine,
    said plate having an aperture with a diameter substantially the same as the diameter of the carburetor bore, not more than approximately 180° of the inner circumference of said aperture including a flange comprising a multiplicity of planar surfaces constructed and defined to extend towards the center of the aperture a preselected distance to intercept the portion of the fluid flowing therethrough and yet to minimize the restriction of the fluid flowing from only the descending portion of a throttle valve, each planar surface being spaced from the adjacent surface or surfaces by an opening extending from the inner circumference of said aperture and between adjacent planar surfaces, said latter mentioned opening having a preselected configuration, each of the planar surfaces extending downwardly from the plane of the plate at a preselected acute angle.

4. A plate having a preselected configuration for use with a carburetor-manifold system of an internal combustion engine, as defined in claim 3, wherein said opening is V shaped with the apex of the V being located on the circumference of said aperture.

5. A plate having a preselected configuration for use with a carburetor-manifold system of an internal combustion engine, as defined in claim 4, wherein said V shaped opening is defined with an angle of approximately 60 degrees.

6. A device for use with a throttle valve of a conventional carburetor utilized in combination with the carburetor-manifold bores conveying a fuel-air mixture into an internal combustion engine,
said device comprising means adapted to be secured between the carburetor and manifold adjacent the carburetor throttle valve, said means having an aperture with a diameter substantially the same as the diameters of the carburetor-manifold bores, said aperture including a flanged surface extending into the aperture only on the side of the aperture receiving the descending portion of the throttle valve without interfering with the operation of the throttle valve,
said flanged surface comprising a plurality of spaced apart flanged surfaces each having the same configuration for intercepting a small portion of the fuel-air mixture conveyed into the manifold by means of the carburetor throttle valve while permitting said mixture to flow between each flanged surface to thereby create a turbulence in said mixture immediately below each face of each flanged surface as said mixture moves over each of the flanged surfaces.

7. A device for use with a throttle valve of a conventional carburetor utilized in combination with the carburetor-manifold bores conveying a fuel-air mixture into an internal combustion engine, as defined in claim 6, wherein said flanged surfaces are spaced apart by an opening having a V shape, with the apex of the V being in coincidence with the aperture for said means.

8. A device for use with a throttle valve of a conventional carburetor utilized in combination with the carburetor-manifold bores conveying a fuel-air mixture into an internal combustion engine, as defined in claim 6, wherein the top surface areas of the flanged surfaces exposed to the fuel-air mixture is in the range of 15-25% of the total carburetor-manifold bore area.

9. A device for use with a throttle valve of a conventional carburetor utilized in combination with the carburetor-manifold bores conveying a fuel-air mixture into an internal combustion engine, as defined in claim 6, wherein said means comprises a plate having a thickness proportioned relative to the diameter of the carburetor-manifold bores and relative to 3/32 of an inch.

10. A device for use with a throttle valve of a conventional carburetor utilized in combination with the carburetor-manifold bores conveying a fuel-air mixture into an internal combustion engine, as defined in claims 6, wherein each of the flanged surfaces are defined at an acute angle descending into the manifold bore to permit the descending lip of the throttle valve to travel immediately adjacent the flanged surfaces.

11. A device for use with a throttle valve of a conventional carburetor utilized in combination with the carburetor-manifold bores conveying a fuel-air mixture into an internal combustion engine, as defined in claim 10, wherein said acute angle is on the order of 32 degrees from a horizontal plane to provide a throttle valve clearance on the order of 1/16 of an inch.

12. A device for use with a throttle valve of a conventional carburetor utilized in combination with the carburetor-manifold bores conveying a fuel-air mixture into an internal combustion engine, as defined in claim 7, wherein said flanged surfaces are spaced apart by three V-shaped openings defined by an acute angle.

13. A device for use with a throttle valve of a conventional carburetor utilized in combination with the carburetor-manifold bores conveying a fuel-air mixture into an internal combustion engine, as defined in claim 12, wherein said V-shaped openings are proportioned relative to the diameter of the carburetor-manifold bores to fall within the approximate range of 45 to 75 degrees.

14. A device for use with a throttle valve of a conventional carburetor utilized in combination with the carburetor-manifold bores conveying a fuel-air mixture into an internal combustion engine, as defined in claim 13, wherein said V-shaped openings are approximately 60 degrees.

15. A device for use with a throttle valve of a conventional carburetor utilized in combination with the carburetor-manifold bores conveying a fuel-air mixture into an internal combustion engine, as defined in claim 7 or 8, wherein the inner ends of each flanged surface is a portion of an arc of a circle coaxial with the carburetor-manifold bores and a preselected diameter proportioned relative to said bores.

16. A method of improving the mixing of fuel and air for use in an internal combustion engine having a carburetor, the carburetor having a throttle valve immediately adjacent the outlet bore of the carburetor for controlling the volume of the fuel-air mixture flowing out of the carburetor past the throttle valve and into the internal combustion engine by means of a manifold connected therebetween during the opening of the throttle valve from a closed position to open positions over normal driving speeds of the vehicle equipped with the internal combustion engine creating a normally large rotating vortex immediately below the fuel exit side of the throttle valves, including the steps of
intercepting the flow of the fuel-air mixture by means of a surface immediately after the mixture flows between the adjacent surface of the outlet bore and only the lower edge of the descending portion of the throttle valve of the carburetor, and
shaping the intercepting surface to cause the intercepted fuel-air mixture to create a plurality of relatively small vortices rotating in a plane parallel to and interfering with said large vortex to thereby reduce the back pressure created at the throttle valve whereby an increased volume, and more thoroughly mixed fuel-air mixture flows into the internal combustion engine.

17. A method of improving the mixing of fuel and air for use in an internal combustion engine having a carburetor, the carburetor having a throttle valve immediately adjacent the outlet bore of the carburetor for controlling the volume of the fuel-air mixture flowing out of the carburetor past the throttle valve and into the internal combustion engine by means of a manifold connected therebetween during the opening of the throttle valve from a closed position to open positions over normal driving speeds of the vehicle equipped with the internal combustion engine creating a normally large rotating vortex immediately below the fuel exit side of the throttle valve, as defined in claim 16, including the step of locating the intercepting surface over approximately 180° of the outlet bore of the carburetor.

18. A method of improving the mixing of fuel and air for use in an internal combustion engine having a carburetor, the carburetor having a throttle valve immediately adjacent the outlet bore of the carburetor for controlling the volume of the fuel-air mixture flowing out of the carburetor past the throttle valve and into the internal combustion engine by means of a manifold connected therebetween during the opening of the throttle valve from a closed position to open positions over normal driving speeds of the vehicle equipped with the internal combustion engine including the steps of intercepting only the portion of the fuel-air mixture conveyed between the descending end of the throtte valve and the adjacent wall of the outlet bore of the carburetor, and creating a turbulence in the intercepted portion of the fuel-air mixture while minimizing the restriction of the flow of the mixture into the internal combustion engine to thereby improve the quality of the mix of the fuel-air mixture and the volume of flow of said mixture into the internal combustion engine while increasing the manifold vacuum.

19. A method of improving the operation of an internal combustion engine having a carburetor-manifold combination for delivering a fuel-air mixture to the engine therethrough, the carburetor having a throttle valve adjacent the carburetor outlet bore communicating with the manifold bore, the fuel-air mixture conveyed beyond the throttle valve creating a rotating vortex immediately below the surface of the throttle valve and rotating at an approximate right angle to the axis of the carburetor-manifold bores, the method including the step of creating a multiplicity of relatively small rotating vortices adjacent the fuel-air mixture exit around the throttle valve immediately adjacent only the descending portion of the throttle valve to interact with the first mentioned rotating vortex thereby improving the fuel-air ratio and mixture of the fuel and air with an increase in manifold vacuum leading to an increased volume of flow of the fuel-air mixture into the internal combustion engine whereby improved combustion of the fuel-air mixture is realized by the internal combustion engine evidenced by an increase in power output of the engine for any one setting of the carburetor throttle valve.

20. A method of improving the operation of an internal combustion engine having a carburetor-manifold combination for delivering a fuel-air mixture to the engine therethrough, the carburetor having a throttle valve adjacent the carburetor outlet bore communicating with the manifold bore, the fuel-air mixture conveyed beyond the throttle valve creating a rotating vortex immediately below the surface of the throttle valve and rotating at an approximate right angle to the axis of the carburetor-manifold bores, as defined in claim 19, wherein said small vortices have individual axes arranged at different angles to the axis of the first mentioned vortice axis but in a plane horizontal thereto.

21. A method of improving the operation of an internal combustion engine having a carburetor-manifold combination for delivering a fuel-air mixture to the engine therethrough, the carburetor having a throttle valve adjacent the carburetor outlet bore communicating with the manifold bore, the fuel-air mixture conveyed beyond the throttle valve creating a rotating vortex immediately below the surface of the throttle valve and rotating at an approximate right angle to the axis of the carburetor-manifold bores, as defined in claim 19, wherein said small vortices are created at approximately 180 degrees of the carburetor-manifold bores on the side of the descending end of the throttle valve as it moves from a closed to an open position.

* * * * *